(12) United States Patent
Kates

(10) Patent No.: US 7,461,343 B2
(45) Date of Patent: Dec. 2, 2008

(54) TOUCH-SCREEN REMOTE CONTROL FOR MULTIMEDIA EQUIPMENT

(76) Inventor: Lawrence Kates, 1111 Bayside Dr., Corona Del Mar, CA (US) 92625

( * ) Notice: Subject to any disclaimer, the term of this patent is extended or adjusted under 35 U.S.C. 154(b) by 469 days.

(21) Appl. No.: 10/983,419

(22) Filed: Nov. 8, 2004

(65) Prior Publication Data

US 2006/0101338 A1    May 11, 2006

(51) Int. Cl.
*G06F 3/00* (2006.01)

(52) U.S. Cl. .................. 715/716; 715/809; 345/173; 725/39; 725/40; 725/56

(58) Field of Classification Search .............. 715/716, 715/809; 345/173; 725/39, 40, 56
See application file for complete search history.

(56) References Cited

U.S. PATENT DOCUMENTS

| | | | |
|---|---|---|---|
| 5,900,868 A * | 5/1999 | Duhault et al. ............. | 725/42 |
| 5,956,025 A * | 9/1999 | Goulden et al. ............ | 715/716 |
| 6,020,930 A * | 2/2000 | Legrand ..................... | 725/41 |
| 6,401,059 B1 * | 6/2002 | Shen et al. .................. | 703/27 |
| 6,437,836 B1 * | 8/2002 | Huang et al. ............... | 348/734 |
| 6,469,633 B1 * | 10/2002 | Wachter .................... | 340/825.69 |
| 6,496,122 B2 * | 12/2002 | Sampsell ................... | 340/825.69 |
| 6,747,591 B1 * | 6/2004 | Lilleness et al. ............ | 341/176 |
| 6,983,418 B1 * | 1/2006 | Scott ......................... | 715/700 |
| 6,989,763 B2 * | 1/2006 | Wall et al. .................. | 340/825.69 |
| 7,184,649 B2 * | 2/2007 | Armengaud ............... | 386/95 |
| 7,190,345 B2 * | 3/2007 | Nashida et al. ............. | 345/156 |
| 2002/0070958 A1 * | 6/2002 | Yeo et al. ................... | 345/723 |
| 2002/0171670 A1 | 11/2002 | Clernock et al. | |
| 2003/0035074 A1 | 2/2003 | Dubil et al. | |
| 2003/0035075 A1 | 2/2003 | Butler et al. | |
| 2003/0095156 A1 * | 5/2003 | Klein et al. ................ | 345/864 |
| 2003/0103088 A1 * | 6/2003 | Dresti et al. ................ | 345/835 |
| 2005/0240967 A1 * | 10/2005 | Anderson et al. ........... | 725/52 |

FOREIGN PATENT DOCUMENTS

WO    WO 02/052856 A2    7/2002

(Continued)

OTHER PUBLICATIONS

Standalone TIVO Screenshots, http:V/www.pvrcompare.com/tivo2images.html, 12 pages.

(Continued)

*Primary Examiner*—Weilun Lo
*Assistant Examiner*—Tuyetlien T Tran
(74) *Attorney, Agent, or Firm*—Knobbe, Martens, Olson & Bear, LLP

(57) ABSTRACT

A multimedia control system presents program schedule information to a user in a visually and intellectually-intuitive manner. The multimedia control system can be used to display programming information, control multimedia devices, control home automation devices, etc. In one embodiment, a control screen used to display programming information is configured as a touch screen to allow the user to select programming, control multimedia devices, or perform other functions by touching the screen. In one embodiment, the system uses a consistent, user-selectable, intuitive user interface. In one embodiment, programming information is dynamically updated to provide the user with current programming information, such as, for example, sports scores, commercial breaks, news stories, documentary contents, etc.

57 Claims, 11 Drawing Sheets

FOREIGN PATENT DOCUMENTS

| WO | WO 02/052856 A3 | | 7/2002 |
|---|---|---|---|
| WO | WO 03/044625 A2 | | 5/2003 |
| WO | WO 03/044625 A3 | | 5/2003 |
| WO | WO 03/085965 | * | 10/2003 |

OTHER PUBLICATIONS

DirecTV/TIVO Screenshots, http://www.pvrcompare.com/dtimages.html, 10 pages.

ReplayTV Screenshots, http://www.pvrcompare.com/rpimages.html. 6 pages.

JavaHMO Screenshots, http://javahmo.sourceforge.net/screenshots.html, 9 pages.

Screenshots of Styles, http://www.pacificneotek.com/styles/StyleDocumentation.html, 10 pages.

Dunn, Jason, 20% Off Voice Operated TV Remote Controller, http://www.pocketpcthoughts.com/index.php?action=expand,32689, Sep. 27, 2004, 3 pages.

Model SUR-35 Touch Screen Universal Remote Control User's Manual, Sima Products Corporation, 2002, 30 pages.

* cited by examiner

TOUCH-SCREEN REMOTE CONTROL FOR MULTIMEDIA EQUIPMENT

BACKGROUND OF THE INVENTION

1. Field of the Invention

The present invention relates to systems selection of television and/or radio programming.

2. Description of the Related Art

Multimedia devices such as VCRs, DVD players, MP3 players, cassette players, CD players, SetTop Boxes (STBs) for cable and satellite television, and the new class of Personal Video Recorders (PVRs) such as TIVO, are extremely popular with consumers. Almost every household in the United States has at least one of these devices.

The most common user complaint is that these devices are difficult to use and understand. Menus used to guide users through options delivered by the multimedia devices are also confusing and cryptic. The menus are simplistic and text based. Cursor appearance and movement are rudimentary and the user is easily confused by the non-intuitive uses of menu choices.

Multimedia program schedule information provided by cable and satellite providers has been physically tied to an archaic display method. Service providers are under the false belief that viewers are conditioned to interpret and understand the television schedule presentation methods that originated from print media such as newspapers.

Television program schedule information has traditionally been displayed either in a columnar or tabular form. The tabular method displays program schedule information as a two dimensional table. The vertical axis displays the television channel numbers and the horizontal axis displays the time periods. The names of the television programs for each channel are listed horizontally across the table. Each show is listed under the time period during which it is shown.

The columnar method displays the channels and program names under a time heading. TV Guide is an example of the columnar method. This works well for printed matter because the reader looks through the columns for the desired time period and finds all of the channels and program names starting at that time.

A dominant television schedule format is the grid format. This format is popular for displaying television schedule information on the TV screen. The television schedule information is displayed in much the same form as the tabular approach. A two-dimensional table format is laid out. The vertical axis displays the channel numbers or IDs with the horizontal axis displaying half hour time increments. Programs are blocked out within the table. A show is represented by a rectangular colored block. This block extends horizontally from the program start time to the program end time.

The viewer either scrolls through the channel list or it is rotated automatically. Information beyond the time period is not displayed and only shifts to the right as time advances.

The problem with the grid format is that it is limited by the television resolution, screen size, and viewing distance. This limits the information displayed an hour or two, and the channel list to around seven channels. Additionally, some applications attempt to place advertising information within the grid format. This leads to a visual overload of information to the viewer and a cluttered appearance.

STBs and PVRs use the television screen to display programming information. The user is forced to use a remote control or other device to manipulate a cursor on the screen to select programming. This is a cumbersome and frustrating process and the user cannot watch a program or movie while scrolling through the programming list

SUMMARY

These and other problems are solved by a multimedia control system. The control system presents program schedule information to the user in a visually and intellectually-intuitive manner. The multimedia control system can be used to display programming information, control multimedia devices, control home automation devices, etc. In one embodiment, a control screen used to display programming information is configured as a touch screen to allow the user to select programming, control multimedia devices, or perform other functions by touching the screen. In one embodiment, the system uses a consistent, user-selectable, intuitive user interface. In one embodiment, programming information is dynamically updated to provide the user with current programming information, such as, for example, sports scores, commercial breaks, news stories, documentary contents, etc.

In one embodiment, a program guide screen provides a list of the programs that are currently airing, were aired, or are scheduled. In one embodiment, the program guide screen is separate from the television screen, so that the user can watch a program while browsing the program guide schedules.

In one embodiment, the programming information is provided in a matrix format such that the programming content of a relatively large number of channels can be displayed on a single control screen.

In one embodiment, the program guide information in a multi-column mode. A two column mode displays the available channels in a rotating endless list fashion in the left hand column and the programs for the highlighted channel in the right hand column. The user scrolls or pages up or down through the channel list. The interface is consistent throughout all columns with respect to scrolling and paging. Whispering arrows are also consistent in this interface, showing that more information exists in the indicated direction. Information is also more detailed as the highlight bar is moved to the right (successive disclosure) as described above. The current time period is shown on the screen.

As the user changes the time period, the program titles change according to the names of the program that were, are, or will be shown at that time period.

In one embodiment, the multimedia control system includes a processor, a touch-screen display, a communications interface to receive programming information over at least one communications channel, and one or more remote-control interfaces. The processor receives entertainment programming information from the communications interface and displays the programming information on the touch-screen display as a program screen. The processor controls one or more multimedia devices using the remote-control interfaces in response to user inputs from the touch-screen display. The processor provides a dialog-type display in response to user selection of a program displayed on the program screen. The processor updates the program screen to indicate the current content of one or more programs in the programming information.

In one embodiment, the remote-control interface includes an infrared interface. In one embodiment, the remote-control interface includes a radio-frequency interface. In one embodiment, the communication channel includes a computer network.

In one embodiment, the communication channel includes an Internet connection. In one embodiment, the communication channel includes a wireless networking channel. In one embodiment, the communication interface includes a satellite-radio receiver. In one embodiment, the communication interface includes a local area network interface. In one embodiment, the communication interface includes a wireless local area network interface.

In one embodiment, the program screen includes one or more graphical user interface buttons. In one embodiment, the graphical user interface buttons include a button to select a desired program. In one embodiment, the graphical user interface buttons include a button to select a device-control screen. In one embodiment, the graphical user interface buttons includes a button to select a setup screen. In one embodiment, the graphical user interface buttons include a button to open a dialog-type window corresponding to a selected program.

In one embodiment, the programming information includes information related to a current score of a program showing a sporting event. In one embodiment, the programming information includes information related to a current news topic a news program. In one embodiment, the programming information includes information related to a current news topic a news program.

In one embodiment, the program screen includes at least one or more graphical user interface buttons, each graphical user interface button corresponding to a program, each graphical user interface button configured to display an icon corresponding to the program. In one embodiment, the icon displays video content of the program. In one embodiment, the icon corresponds to an episode of the program.

In one embodiment, the programming content includes cable television programming. In one embodiment, the programming content includes satellite television programming. In one embodiment, the programming content includes satellite radio programming. In one embodiment, the programming content includes broadcast radio programming. In one embodiment, the programming content includes DVD programming. In one embodiment, the programming content includes audio CD programming. In one embodiment, the programming content includes previously-recorded programming. In one embodiment, the programming content includes previously-recorded programming stored in a PVR.

In one embodiment, one or more multimedia devices are controlled by a system that receives entertainment programming information over at least one communications channel and supplemental programming information over at least one communications channel. The programming information is displayed on a display screen as a program screen and updated according to the supplemental programming information to indicate a current content of one or more entertainment programs while the programs are in progress. A dialog-type window can be opened for a first entertainment program in response to a first user-input command. A remote-control command is sent to one or more multimedia devices to select a second entertainment program in response to a second user-input command.

In one embodiment, the remote-control command includes an infrared signal. In one embodiment, the remote-control command includes a radio-frequency signal.

In one embodiment, entertainment programming data is received from a computer network. In one embodiment, entertainment programming data is received from an Internet connection. In one embodiment, entertainment programming data is received from a wireless communication channel. In one embodiment, entertainment programming data is received from a wireless computer network. In one embodiment, entertainment programming data is received from a satellite-radio system. In one embodiment, entertainment programming data is received from a local-area network. In one embodiment, entertainment programming data received from a cable television network.

In one embodiment, the user can select a program screen format. In one embodiment, the program screen format includes a matrix of program buttons corresponding to programs that are currently available. In one embodiment, the program screen format includes a matrix wherein a first axis corresponds to time and a second axis corresponds to channel. In one embodiment, the program screen format includes a matrix wherein a first axis corresponds to time and a second axis corresponds to genre.

In one embodiment, the supplemental programming information includes information related to a current score of a program showing a sporting event. In one embodiment, the supplemental programming information includes information related to a current news topic a news program. In one embodiment, the supplemental programming information includes information related to a current topic of a science-related program.

In one embodiment, the human-interface device includes a touch-screen. In one embodiment, the human-interface device includes a computer mouse. In one embodiment, the human-interface device includes a trackball. In one embodiment, the human-interface device includes a speech-recognition system.

DETAILED DESCRIPTION

Figure 1A:
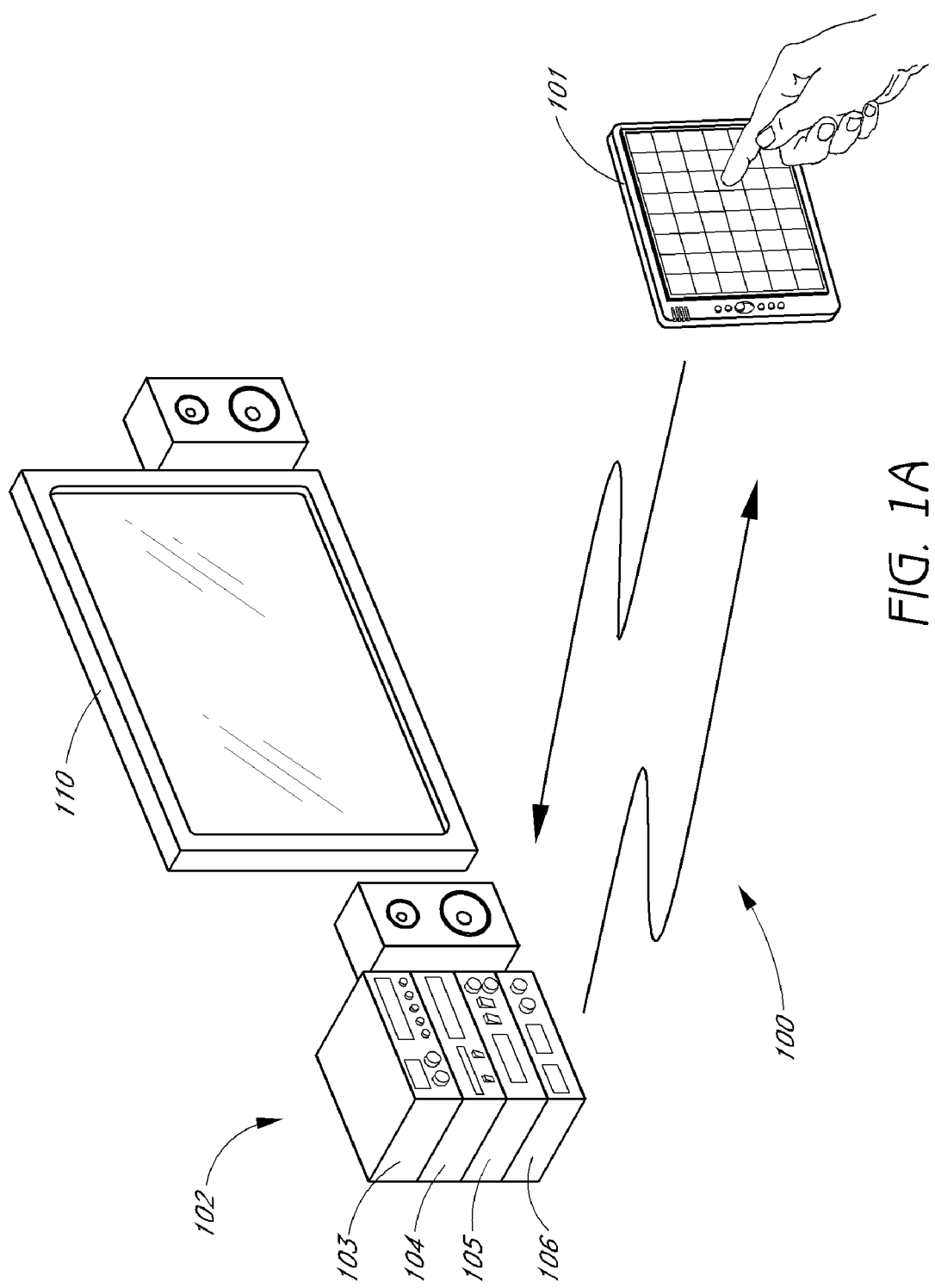
FIG. 1A shows a multimedia control system used in connection with a multimedia entertainment system.

FIG. 1A shows a multimedia control system 101 used in connection with a multimedia entertainment system 102. The entertainment system 102 typically includes a television 110, and one or more multimedia devices, such as, for example, a settop box (STB) 106, a personal video recorder (PVR) 105, a DVD player 104, an AV receiver 103, etc. A user uses the control system 101 to perform remote control-type functions (e.g., control volume, control the channel, select the input device, fast-forward, reverse, slow motion, etc. In one embodiment, the control system 101 provides a touch-screen display that provides programming information and programmable touch-screen buttons to allow the user to control the entertainment system. In one embodiment, the control system 101 provides the functions of a universal remote control and the functions typically provided by on-screen programming.

Figure 1B:
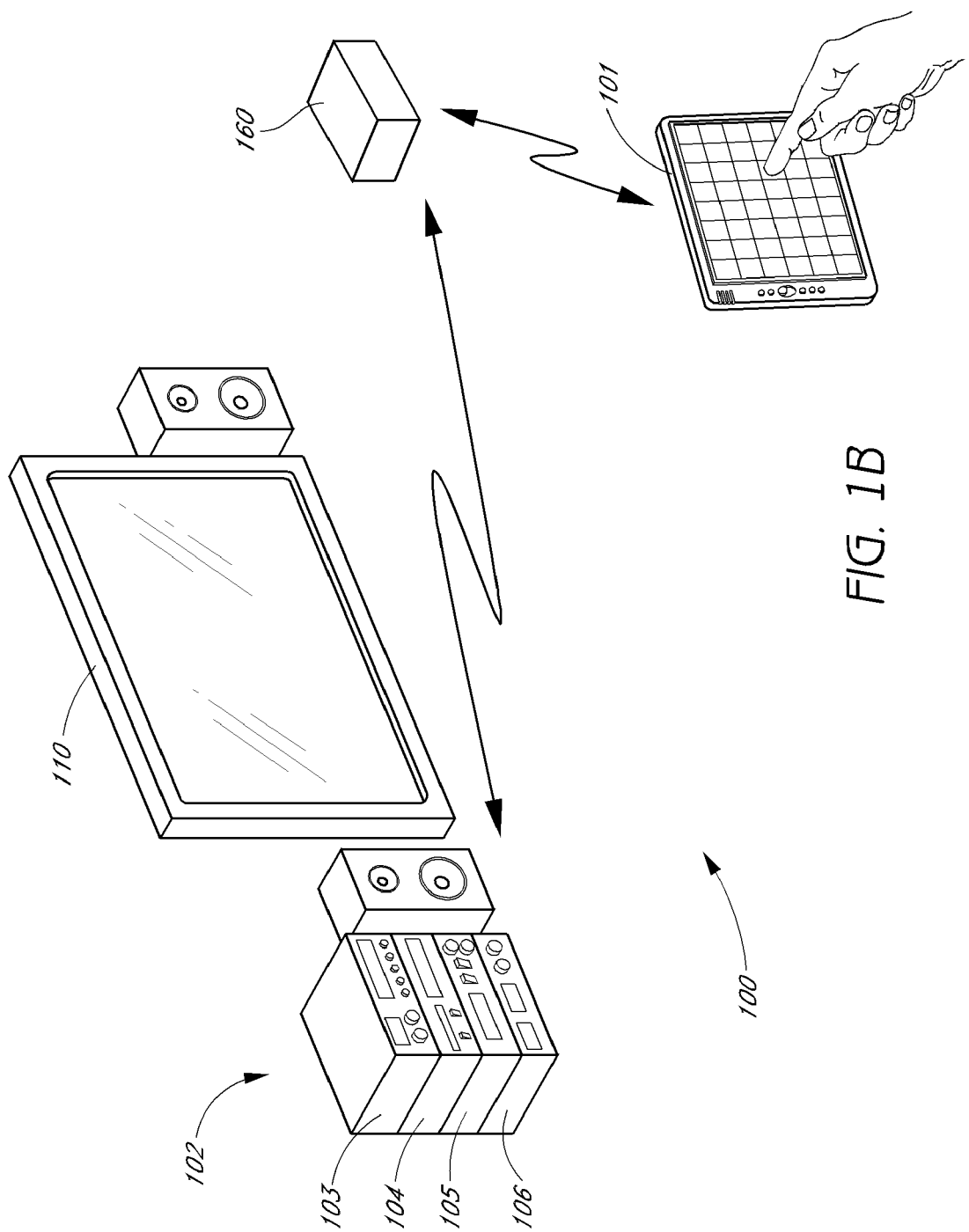
FIG. 1B shows a multimedia control system used in connection with a multimedia entertainment system wherein a repeater relays communication between the multimedia control system and the devices in the multimedia entertainment system.

FIG. 1B shows the multimedia control system 101 used in connection with a repeater 160 to communicate with the multimedia entertainment system 102. The repeater receives commands from the multimedia control system 101 and forwards the commands to the devices of the entertainment system 102. In one embodiment, the multimedia control system 101 communicates with the repeater 160 using wireless radio-frequency communication and the repeater 160 communicates with multimedia entertainment system 102 using infrared and/or wireless radio-frequency communication. Using wireless radio-frequency communication between the multimedia control system 101 and the repeater 160 means the user does not have to "point" the multimedia control system 101 at the multimedia entertainment system 102, as is common with infrared devices. The repeater 160 can be positioned such that the infrared transmitter/receiver in the repeater 160 is pointed towards the multimedia entertainment system 102 and the user is then free to move about the room our house with the multimedia control system 101.

In one embodiment, the repeater is a one-way repeater that forwards commands from the control system 101 to one or more of the multimedia devices 102. In one embodiment, the repeater is a two-way repeater that forwards commands from the control system 101 to one or more of the multimedia devices 102 and that that forwards data or commands from the one or more of the multimedia devices 102 to the control system 101.

Figure 1C:
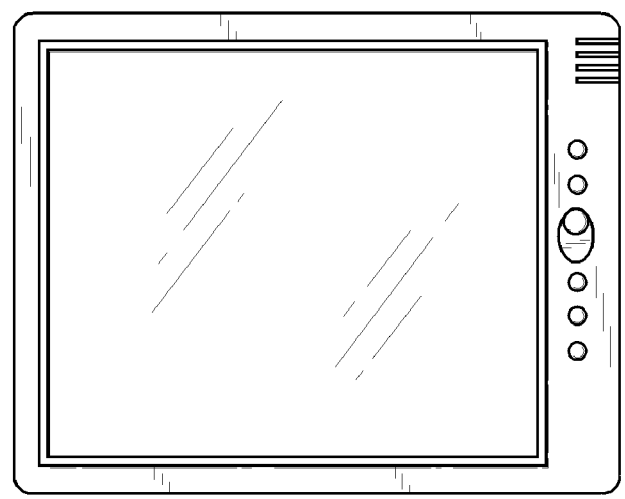
FIG. 1C shows one embodiment of the multimedia control system.
Figure 1D:
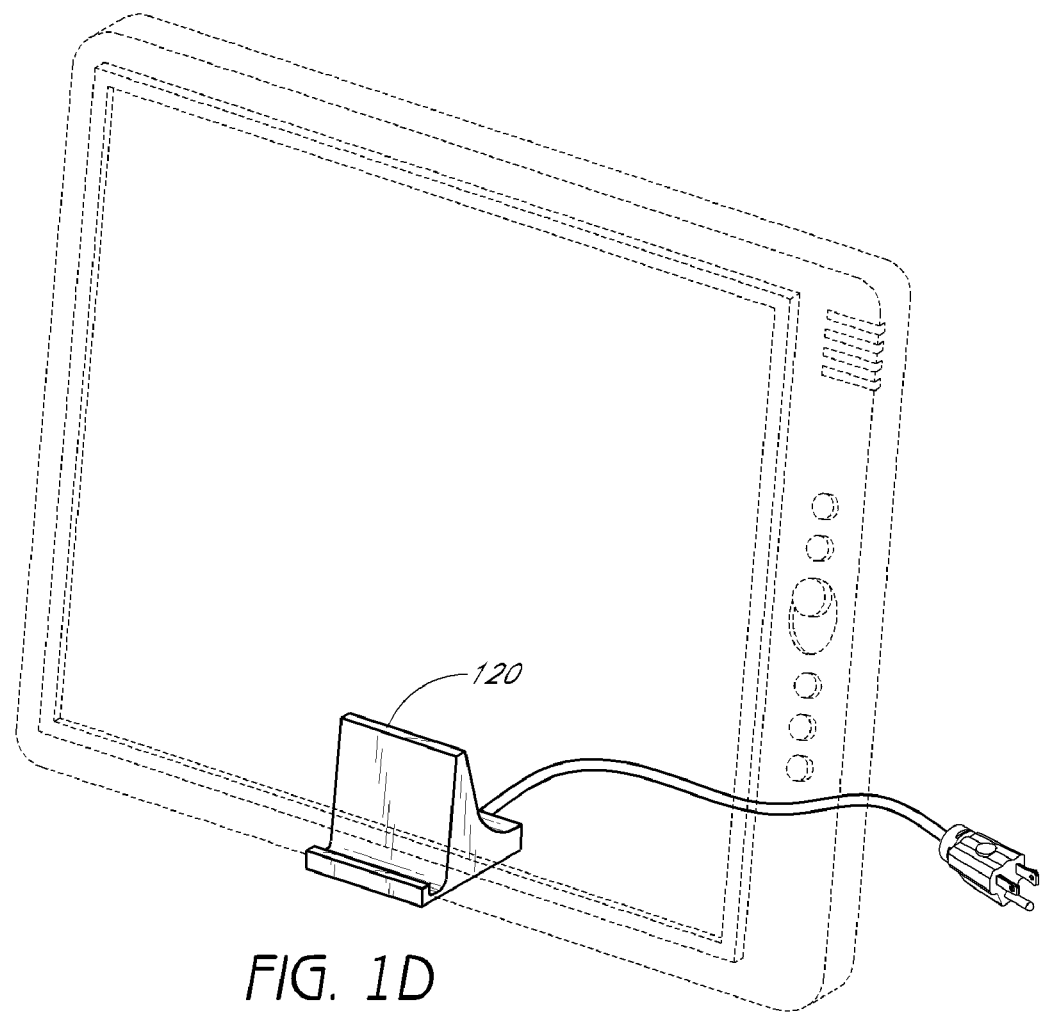
FIG. 1D shows the multimedia control system from FIG. 1B with a docking station.

FIG. 1C shows one embodiment of the multimedia control system 101. FIG. 1D shows the multimedia control system from FIG. 1C with a docking station 120. In one embodiment, the control system 101 is powered by an internal power source (e.g., a battery, fuel cell, etc.). In one embodiment, the docking station 120 provides power to the control system 101 to recharge the internal power source and to conserve power in the internal power source.

Figure 2:
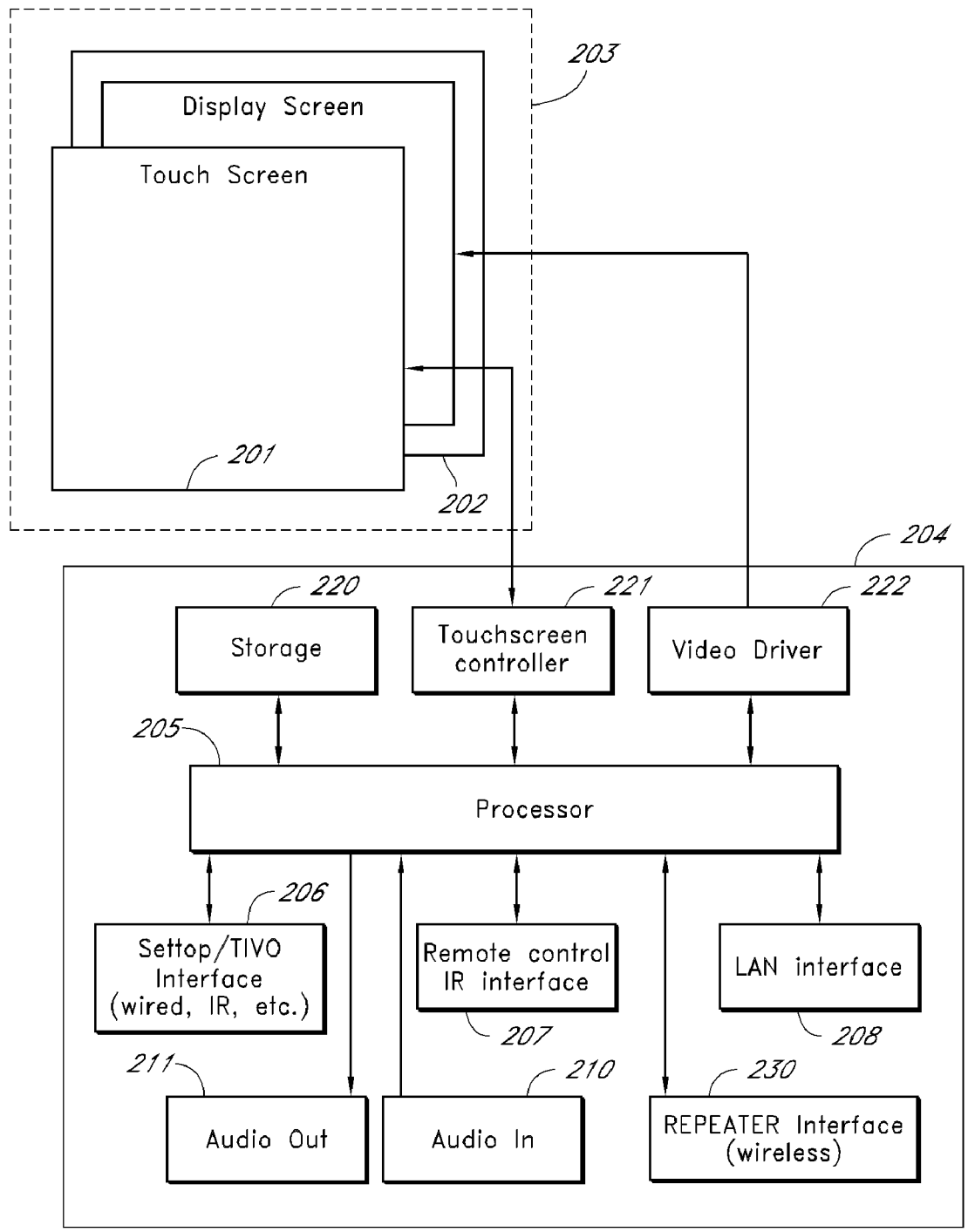
FIG. 2 is a block diagram of the multimedia control system.

FIG. 2 is a block diagram of the multimedia control system 101. The system 101 includes a control module 204 and a touch-screen display 203. The touch-screen 203 includes a display 202 and a touch-screen 201. The control module 204 includes a video driver 222 provided to the display screen 202 and a touch-screen controller 221 provided to the touch screen 201. The video driver 222 and the touch-screen controller 221 are provided to a processor 205. An optional multimedia device interface 206, a remote-control interface 207, and a network interface 208 are also provided to the processor 205. A repeater interface 203 is provided to the processor 205. In one embodiment, an audio input device 210 and an audio output device 211 are also provided to the processor 205. In one embodiment, the network interface 208 is configured as a LAN interface. In one embodiment, the network interface 208 is configured as a wireless LAN interface. In one embodiment, the remote control interface 207 includes an InfraRed (IR) interface. In one embodiment, the remote control interface 207 includes a Radio Frequency (RF) interface. In one embodiment, the multimedia device interface 206 is configured as a wireless interface.

The optional repeater interface 230 is configured to communicate with the repeater 160. The device interface 206 can be wired or wireless. For example, many settop boxes use wireless RF for remote control, thus to communicate with such devices, the device interface 206 can be configured as a wireless RF interface. In one embodiment, the repeater interface 230 is combined with the device interface 206 or the network interface 208 into a single wireless interface.

In one embodiment, the multimedia control system 101 obtains programming information from a multimedia device such as the STB 106 or PVR 105 by using the multimedia device interface 206.

In one embodiment, the multimedia control system 101 obtains programming information from a multimedia device such as a satellite radio receiver (such as, for example, Sirius radio, XM radio, and the like). The programming information can be provided in one or more radio channels or control channels. In such an embodiment, the multimedia device 206 includes a modem to demodulate the information modulated onto the one or more radio channels.

In one embodiment, the multimedia control system 101 obtains programming information from an Internet server by using the network interface 208.

The remote control interface 207 is configured to control one or more of the multimedia devices 102 using remote control codes (either directly or through the repeater 160). The processor formats information for the display and provides the information to the video driver 222. The touch-screen controller interfaces with the touch screen 201. When the user touches the touch screen 201, information about where the user touched the touch-screen is provided by the touch-screen controller 221 to the processor 205. Other user input devices such as a mouse, a keyboard, a trackball, etc. can also be used. However, the touch screen 201 is typically generally more convenient for the user. In one embodiment, the audio input device 211 is used in connection with speech recognition processing to provide for voice activated commands.

In one embodiment, the setup 101 can be configured by using a program running on a home computer. In one embodiment, the system 101 includes one or more input/output ports (e.g., USB ports, firewire ports, etc.) to allow the user to connect devices such as keyboards, computer mice, etc.

Figure 3:
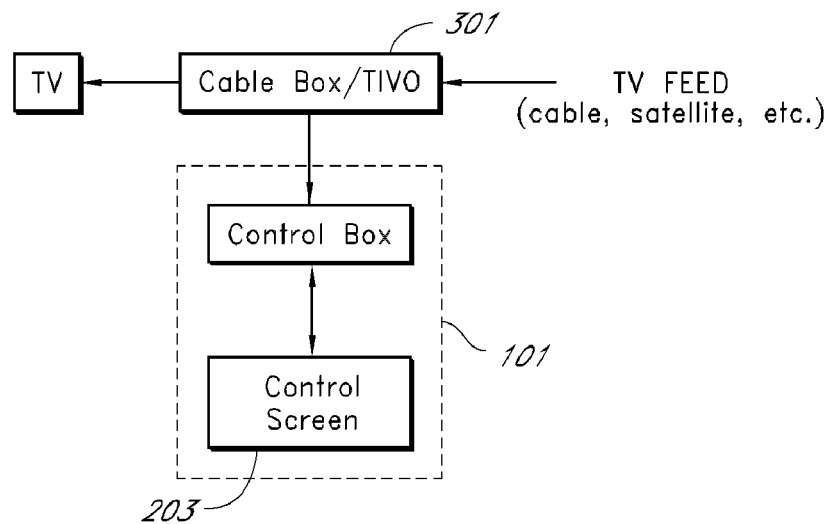
FIG. 3 is a block diagram showing one embodiment of the multimedia control system wherein the multimedia control system obtains programming information from a multimedia devices such as a settop box, personal video recorder, etc.

FIG. 3 is a block diagram showing one embodiment of the multimedia control system wherein the multimedia control system 101 obtains programming information from one or more multimedia devices 301 such as the STB 106, the PVR 105, etc. The multimedia device 301 receives programming information and video feeds from a cable network, satellite network, etc. The multimedia device 301 provides the programming information to the multimedia control system 200. The multimedia control system 200 display the programming information to the user and the user can use the touch-screen 201 to select the desired program. The multimedia control system 200 then sends commands to one or more of the multimedia devices 102 to select the desired programming.

Figure 4:
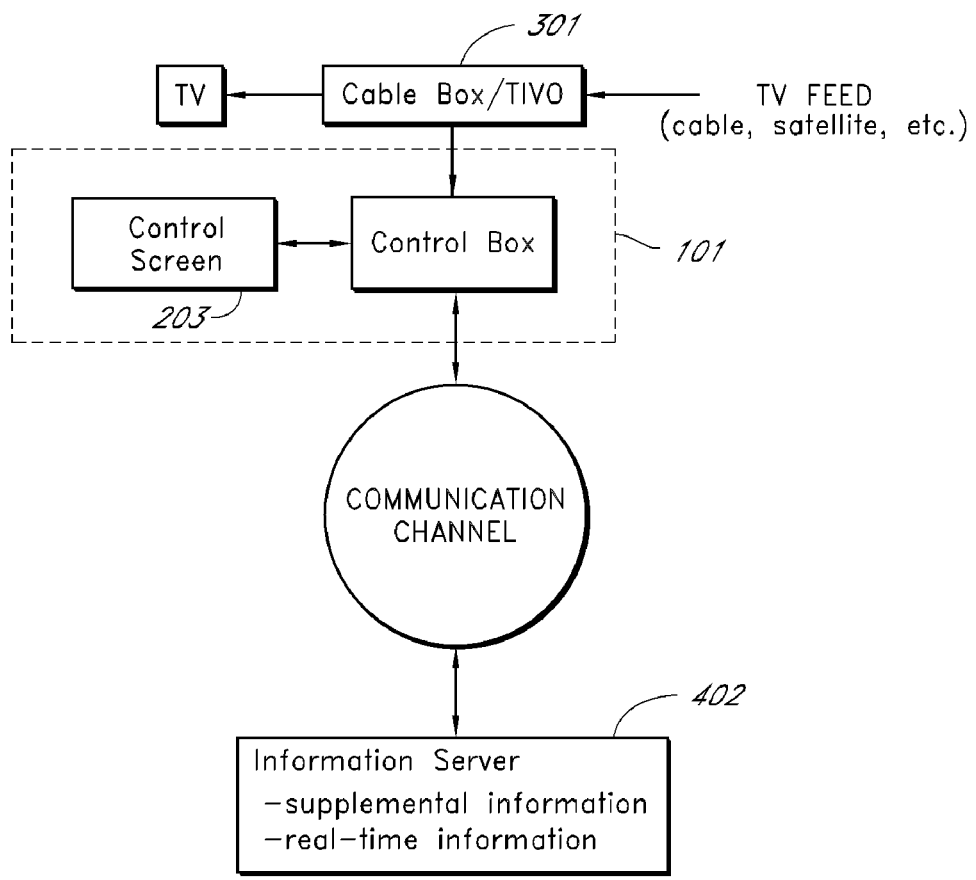
FIG. 4 is a block diagram showing one embodiment of the multimedia control system wherein the multimedia control system obtains programming information from a multimedia devices such as a settop box, personal video recorder, etc. and supplemental information from an information server.

FIG. 4 is a block diagram showing one embodiment of the multimedia control system wherein the multimedia control system 101 obtains programming information from a the multimedia device 301 as in FIG. 3, and supplemental information from an information server 402 via the Internet or other communication channel (e.g., satellite radio, etc.). The supplemental information can be used to augment and enrich the programming information provided through the multimedia device 301. In one embodiment, the information server 402 provides icons, graphics, and/or text in connection with the programming information. In one embodiment, the information server 402 provides relatively low-resolution video for display on the control system 101 as video icons and/or video preview screens.

The supplemental information can include up-to-date information, historical information, additional details, and the like not provided in connection with the programming information. For example, for a program involving a sporting event, the supplemental information can include the current score. For a program involving a movie, the supplemental information can include the year of the movie, reviews, historical background, names of the actors, director, etc. For a news program or documentary, the supplemental information can include the subject of the current news story.

Figure 5:
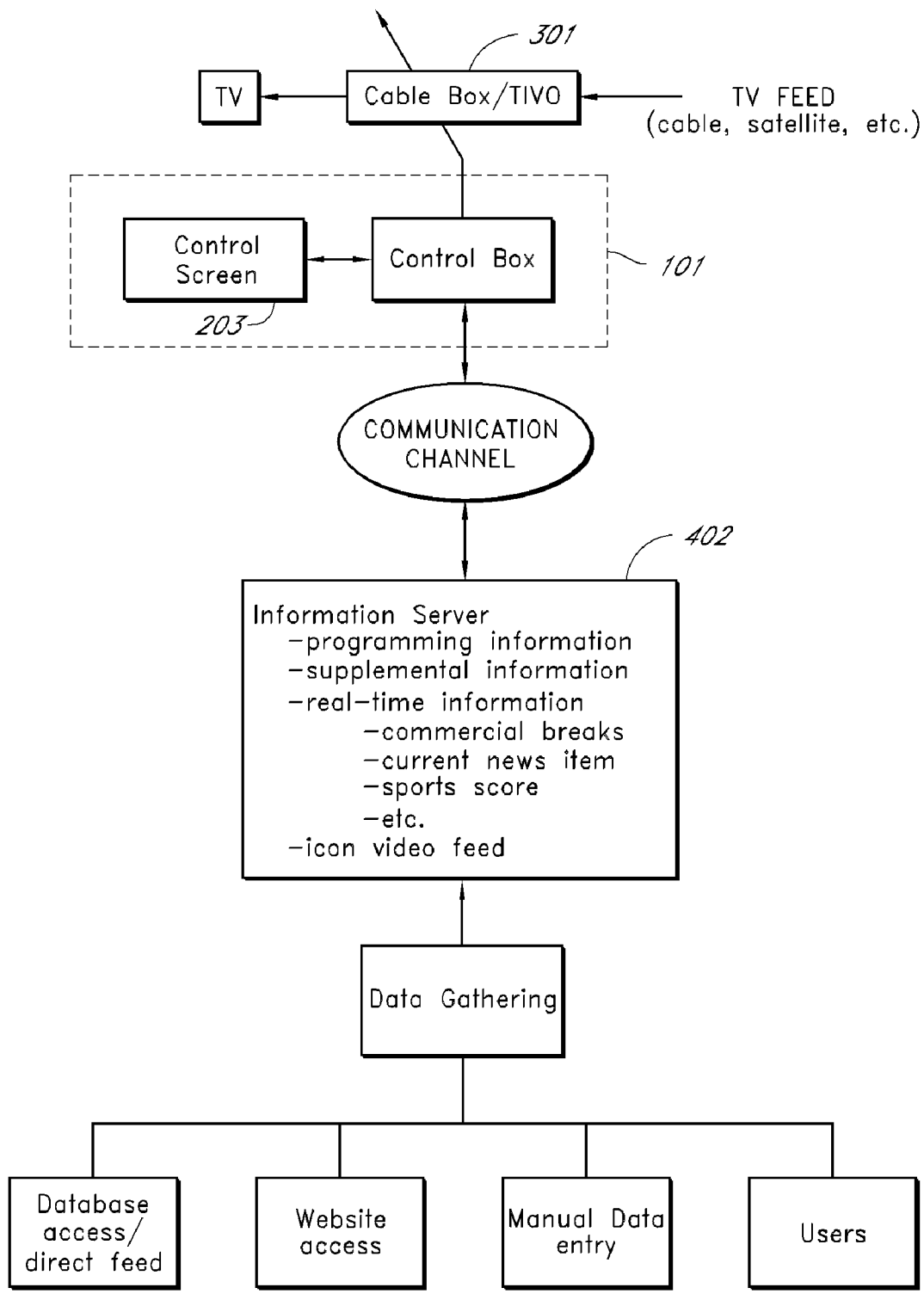
FIG. 5 is a block diagram showing one embodiment of the multimedia control system wherein the multimedia control system obtains programming information and supplemental information from an information server.

FIG. 5 is a block diagram showing one embodiment of the multimedia control system wherein the multimedia control system 101 obtains programming information and supplemental information from the information server 402. In one embodiment, the control system 101 receives programming information from the information server 402 on a batch basis (e.g., a week's worth of programming, a month's worth of programming, etc.) to be stored by the control system 101. If an Internet connection becomes temporarily unavailable, the multimedia control system 101 can still provide programming information to the user from the stored programming information.

During system setup of the multimedia control system 101, the user specifies which television service the user has installed if any (e.g., which satellite company or cable company provide service) and the type of service the user has (e.g., basic cable, basic cable with premium channels, etc.). The multimedia control system 101 forwards such information to the information server 402 so that the information server 402 knows which programming to send to the multimedia control system 101.

Figure 6:
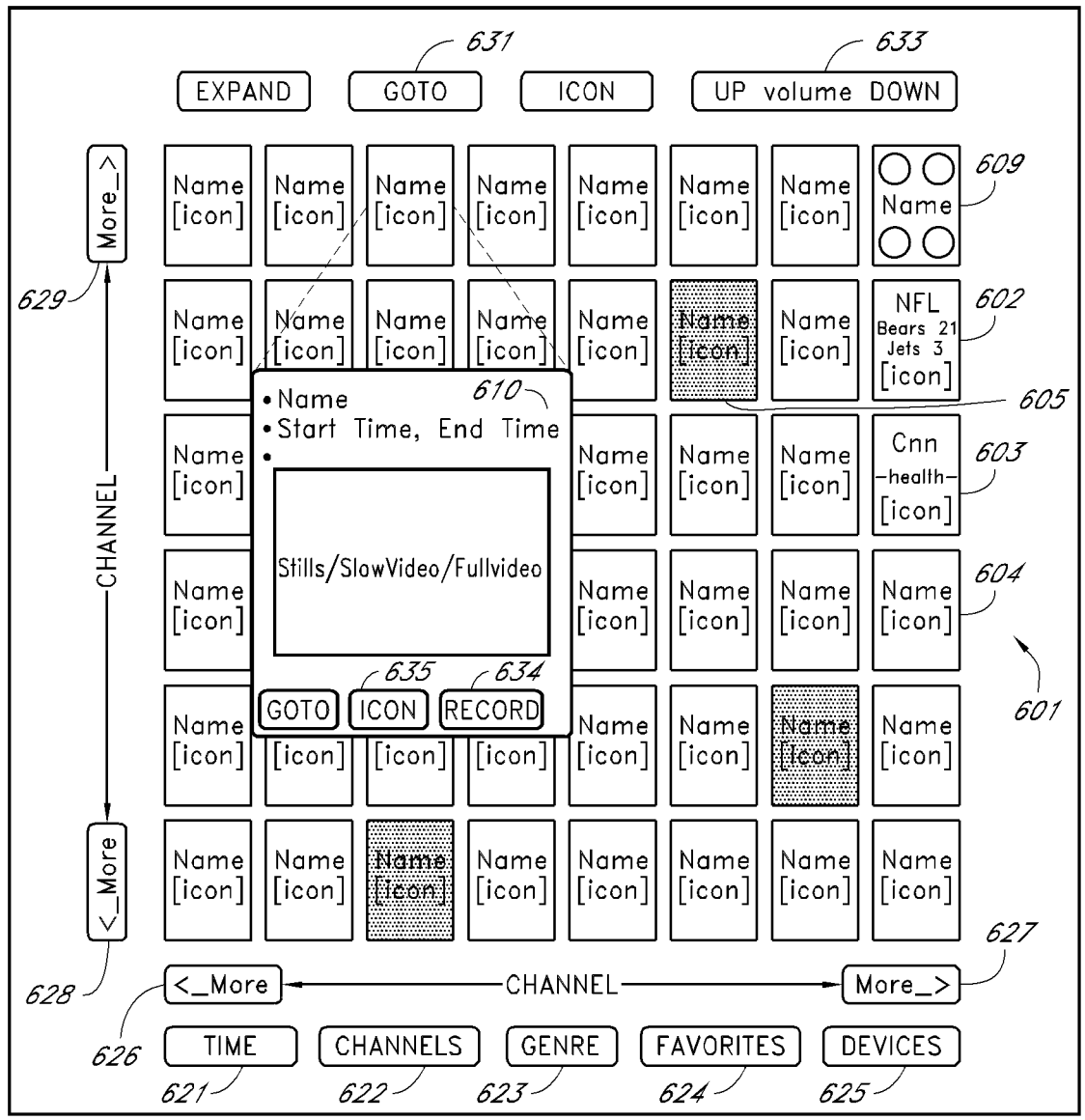
FIG. 6 shows a display screen containing listing programming information, wherein programming is shown for a relatively large number of channels.

FIG. 6 shows a display page 600 on the touch-screen 203 containing listing programming information, wherein programming is shown for a relatively large number of channels. A matrix 601 of buttons displays programming choices. In the example shown in FIG. 6, a button 602 corresponds to a football game, a button 603 corresponds to CNN, a button 604 corresponds to a TV show, etc. The "buttons" are Graphical User Interface (GUI) buttons corresponding to areas on the touch-screen 203. In one embodiment, each button corresponds to a different programming channel (e.g. cable or satellite channel). In one embodiment, one or more of the buttons can also correspond to recorded programs on the PVR 105, content of the DVD in the DVD player 104, etc. A volume control button 633 allows the user to change the sound volume from the system 102. In addition to providing programming information, the system 101 provides the functions usually associated with a remote control. A "DEVICES" button 625 allows the user to select a device-control screen 800 shown in FIG. 8.

Figure 7:
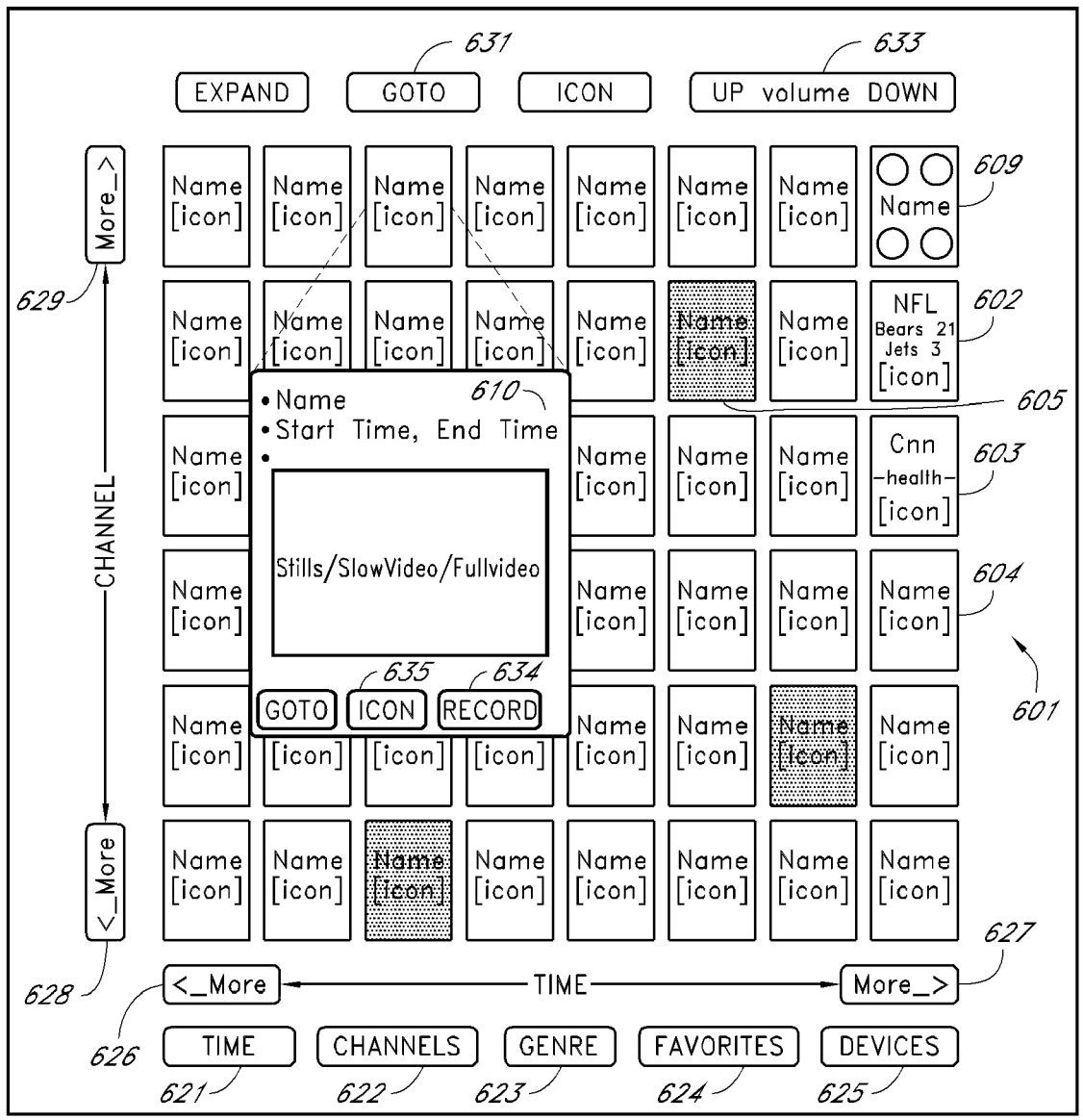
FIG. 7 shows a display screen containing listing programming information, wherein programming is shown for a number of channels and time periods.

A button 626 and a button 627 allow the user to scroll the matrix 601 horizontally. A button 628 and a button 629 allow the user to scroll the matrix 601 vertically. In FIG. 6, the buttons in the matrix correspond to different channels all for the same time period. The time period is selected by the user (e.g., the current time, one hour from now, etc.). This allows relatively many channels to be displayed on the screen. FIG. 7 shows a display screen wherein the horizontal axis of the matrix 601 corresponds to time and the vertical axis of the matrix 601 corresponds to different channels. The user can switch between the matrix formats shown in FIGS. 6 and 7. The user can also select a mode wherein one axis of the matrix corresponds to channels and the other axis of the matrix corresponds to programming genre. The user can also select a mode wherein one axis of the matrix corresponds to time and the other axis of the matrix corresponds to programming genre. A button 621 allows the user to indicate that at least one axis of the matrix should correspond to "time". A button 622 allows the user to indicate that at least one axis of the matrix should correspond to "channels". A button 623 allows the user to indicate that at least one axis of the matrix should correspond to programming genre. A button 624 allows the user to indicate that at least one axis of the matrix should correspond to the users favorites. Thus, for example, by selecting one axis as time, and one axis as favorites, the user can produce a matrix 601 that shows when the user's favorite programs will be available.

The user can select-highlight a button by touching the touch-screen 203. The user can view the program corresponding to the selected button by pressing a "GOTO" button 631. In one embodiment, the user can double-click a matrix button view the corresponding program. In one embodiment, the user can "expand" a matrix button to show additional information as shown in a window 610 in FIG. 6. The window 610 is similar to a dialog box in Microsoft Windows. The window 610 is relatively larger than a matrix button and thus able to show more information In one embodiment, the window 610 includes additional text, such as, for example, the start time, end time, names of the actors, awards, reviews, historical information related to the program, etc. In one embodiment, the window 610 includes a video area where the actual video from the program is displayed (either as full motion video, slow motion video, stills, etc.) In one embodiment, the window 610 includes a "RECORD" button 634 to allow the user to indicate that the program should be recorded on a VCR, PVR, etc. An "ICON" button 635 allows the user to close the window 610.

In one embodiment, supplemental information from the information server 402. Thus, in FIG. 6, the button 602 shows the current score, the button 603 shows the subject of the news item, the button 604 lists the title of the episode, etc.

A button 608 shown in FIGS. 6 and 7 shows an optional format that provides four sub-buttons (shown as round circles for illustration) in the comers of the button 608. The user can select some or all of the buttons in the matrix 601 to use the format of the button 608. Each of the four sub-buttons provides a function, such as, for example, "GOTO", "expand", etc. In one embodiment, the user can specify the functions of one or more of the sub-buttons. The sub-buttons of button 608 are show as circles merely for purposes of illustration. In one embodiment, the sub-buttons are not visually shown, but correspond generally to sub-areas of the button such as, for example, two halves (e.g., up-down, left-right) or four quadrants, or other sub-areas of the button 608. Touching one sub-area of the button 608 produces a first function (e.g., expand), and touching a second sub-area of the button 608 produces a second function.

In one embodiment, one or more of the buttons on the display screen 203 are sensitive to single touches or double-touches (analogous to the common single and double mouse button clicks). A single touch produces a first action, while a double touch produces a second action.

In one embodiment, one or more of the buttons on the display screen 203 are sensitive to how long the button is touched. Thus, in one embodiment, a relatively quick touch produces a first action, while a relatively longer touch produces a second action.

In one embodiment, one or more of the buttons on the display screen 203 are sensitive to the pressure of the touch. Thus, in one embodiment, a relatively light touch produces a first action, while a relatively stronger touch (more pressure) produces a second action.

In one embodiment, combinations of sub-areas, single/double touches, length of touch and/or pressure of the touch, are used to provide different functions.

In one embodiment, the user can select the size of the buttons in the matrix 601. Selecting a relatively smaller button size allows more buttons (and thus more programs or channels) to be displayed on the screen at one time. Selecting a relatively larger button size reduces the number of buttons that can be displayed, but allows the use of a larger font thus making the buttons easier to read. The user can select the size of the buttons in the matrix 601 and the font size used for text in the buttons.

In one embodiment, the user can block selected programming channels so that space on the screen is not used for buttons corresponding to channels (e.g., shopping channels, pay-per-view channels, etc.) for which the user has no interest. Similarly, the user can block selected programming genres so that space on the screen is not used for buttons corresponding to genres (e.g., sports, sitcoms, etc.) for which the user has no interest.

In one embodiment, one or more buttons in the matrix 601 can include special indications, such as highlighting (e.g., color-coded, bordered, etc.) negative-highlighting (e.g., dimmed, color-coded, etc.) etc. to convey additional information to the user. In one embodiment, the user can specify preferred genres, shows, etc. and a button in the matrix 601 corresponding to such preference can be highlighted. Buttons corresponding to channels that are currently showing commercials can be negatively-highlighted. In one embodiment, buttons corresponding to pay-per-view channels are indicated. For example, in FIGS. 6 and 7, a button 605 is shown highlighted to indicate that the corresponding channel is currently showing a commercial. Information about which channels are showing commercials at any given time is provided by the information server 402.

In one embodiment, access to the information server 402 is provided on a subscription basis. In one embodiment, the user can choose a relatively low-cost subscription that provides relatively static information such as programming information. In one embodiment, the user can choose an upgraded subscription that includes time-sensitive supplementary information, such as for example, which channels are currently showing commercials, current sports scores (e.g., as shown on the button 602), current program content (e.g., as shown on the button 603), etc.

In one embodiment, the buttons in the matrix 601 include text. In one embodiment, the buttons in the matrix 601 include an icon indicating the program genre. In one embodiment, the buttons in the matrix 601 include an icon indicating the program (e.g., a show logo, picture of the actors, etc.).

In one embodiment, one or more of the buttons in the matrix 601 include a video portion that shows the program as video within the button.

Figure 8:
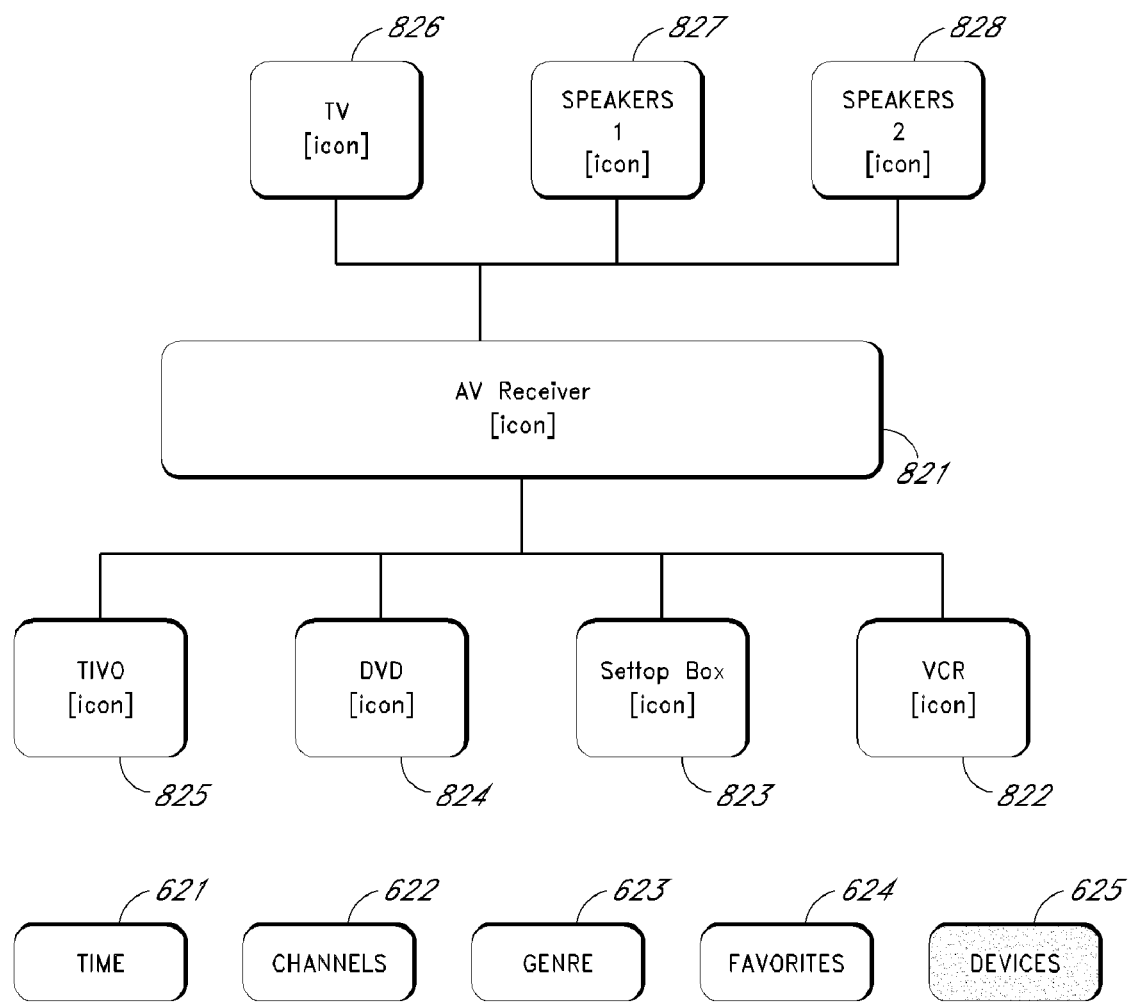
FIG. 8 shows a display screen for controlling one or more multimedia devices.

FIG. 8 shows a display screen 800 for controlling one or more multimedia devices. A button 821 selects the AV receiver 103, a button 822 selects a VCR, a button 823 selects the STB 106, a button 824 selects the DVD player 104, a button 825 selects the PVR 105, a button 826 selects the television 110, a button 827 selects first speakers, and a button 828 selects second speakers. When setting up the system 101, the user selects multimedia devices from a list (or creates new multimedia device entries in the list) and the selected devices are shown on the screen 800. Thus, for example, if the user has a multimedia system that includes only a TV, a STB, a DVD player and an AV receiver, the user would select TV, STB, DVD, and AV receiver, from the setup list and the screen 800 would then no include the button 825 or the button 822. If the user adds a PVR to the multimedia system, the user goes to the setup screen and adds the PVR to the list of devices and the button 825 is then displayed on the screen 800.

As part of the system setup the user specifies which devices are available and the manufacturer and model number of each devices. Knowing the manufacturer and model number allow the system 101 to select the proper remote-control codes to control the multimedia devices.

In one embodiment, the system 101 can also be used to control additional devices such as, for example, home automation devices, home alarm systems, heating and cooling systems, etc. Thus, for example, in a home with a remotely-programmable thermostat, the user can use the system 101 to change the set temperature of the thermostat, turn on heating or cooling, etc.

In one embodiment, the system 101 includes Internet browser software and the touch-screen 203 can be used for Internet browsing.

Figure 9:
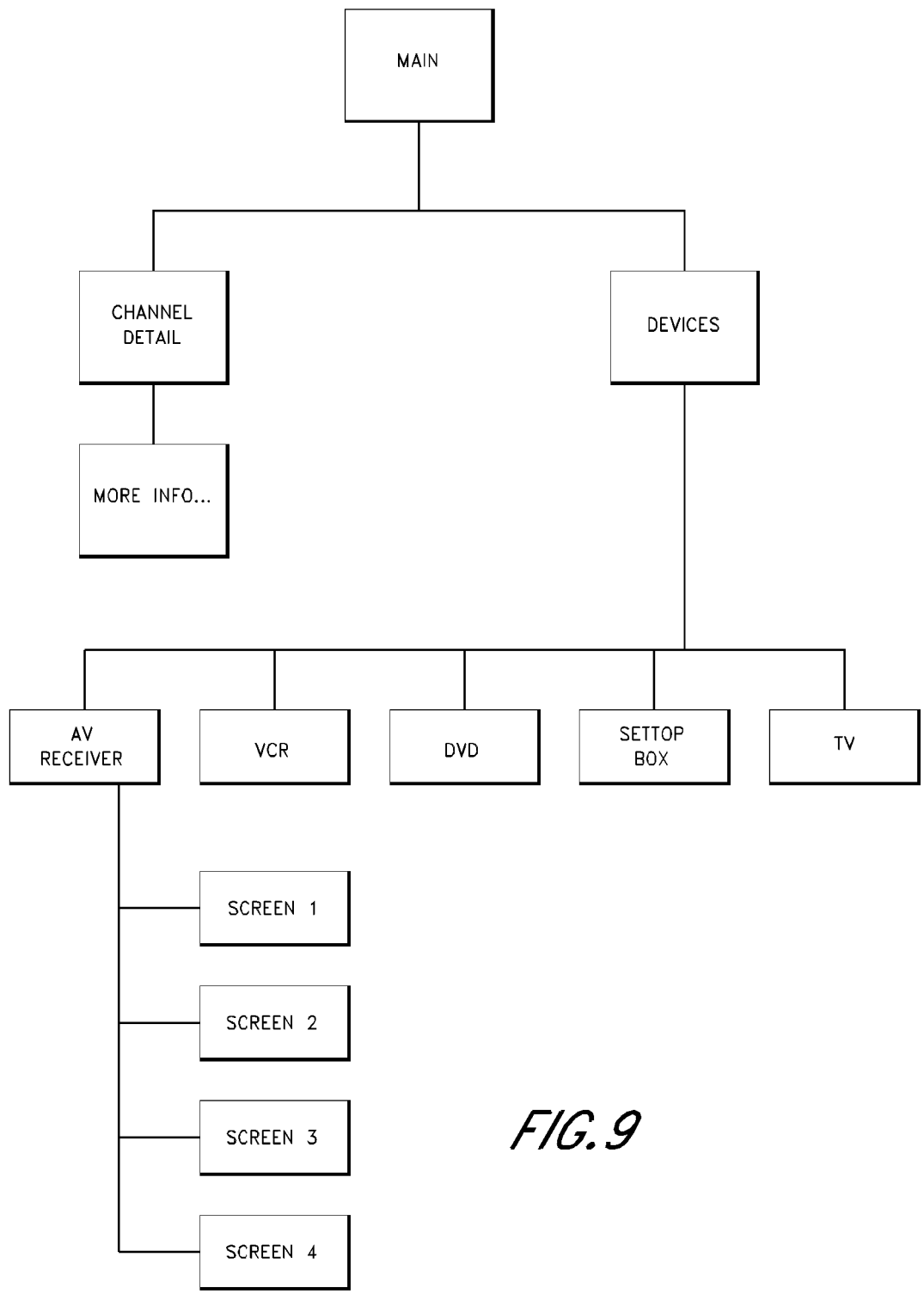
FIG. 9 shows a display screen map for controlling one or more multimedia devices.

FIG. 9 shows a display screen map for controlling one or more multimedia devices.

In one embodiment, the programming data and/or supplemental data provided by the information server 403 is provided as a subscription service.

Although described above in connection with multimedia devices, one of ordinary skill in the art will recognize that the control system 101 can also be used on connection with audio programming, such as, for example, broadcast radio, satellite radio, Internet radio, etc.

In one embodiment, the system 101 is implemented as a computer program running on a personal computer, laptop computer, or tablet computer. One of ordinary skill in the art will recognize that if the system 101 is implemented on a computer that does not have a touch screen, the user can use a computer mouse, joystick, trackball, etc. to select the GUI elements on the display screen 202.

Figure 10:
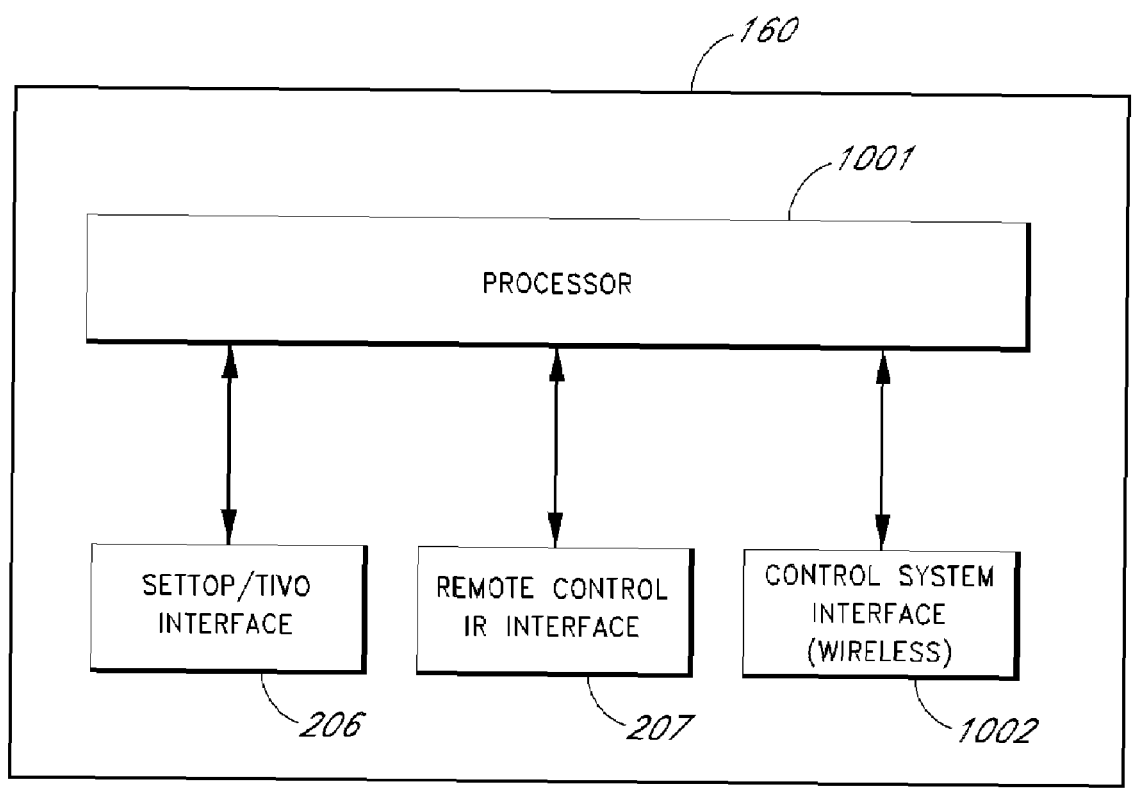
FIG. 10 shows one embodiment of a repeater.

FIG. 10 shows one embodiment of the repeater 160. In the repeater 160, the device interface 206 and the remote control interface 207 are provided to a processor 1001. A wireless control system interface 1002 is also provided to the processor 1001. The wireless control system interface 1002 is configured to wirelessly communicate with the repeater interface 230. The device interface 206 can be wired or wireless. In one embodiment, the device interface 206 and the control system interface 1002 are combined into a single wireless interface. In one embodiment, the control interface 1002 is configured as a network interface (e.g., a wireless LAN interface).

Although various embodiments have been described above, other embodiments will be within the skill of one of ordinary skill in the art. Thus, the invention is limited only by the claims that follow.

What is claimed is:

1. A multimedia control system, comprising:
a processor;
a touch-screen display provided to said processor;
a communications interface provided to said processor, said communications interface configured to receive programming information over at least one communications channel; and one or more remote-control interfaces provided to said processor, said processor configured to receive said programming information from said communications interface and to display said programming information on said touch-screen display as a program screen comprising a plurality of graphical user interface buttons, each graphical user interface button corresponding to a program, each graphical user interface button configured to display an icon corresponding to said program; wherein the plurality of graphical user interface buttons are arranged in a matrix format wherein a first axis of said matrix corresponds to time and a second axis of said matrix corresponds to channel, said processor configured to control one or more multimedia devices using said one or more remote-control interfaces in response to user inputs from said touch-screen display, said processor further configured to provide a dialog-type pop-up display in response to user selection of one of the icon displayed on said matrix of said program screen to show additional information related to a program corresponding to the selected icon, said processor configured to update said program screen to graphically highlight one or more of said icons of the plurality of graphical user interface buttons corresponding to programs that are on commercial break to graphically distinguish programs that are currently in a commercial break from programs are not currently in a commercial break.

2. The multimedia control system of claim 1, wherein said remote-control interface comprises an infrared interface.

3. The multimedia control system of claim 1, wherein said remote-control interface comprises a radio-frequency interface.

4. The multimedia control system of claim 1, wherein said communication channel comprises a computer network.

5. The multimedia control system of claim 1, wherein said communication channel comprises an Internet connection.

6. The multimedia control system of claim 1, wherein said communication channel comprises a wireless networking channel.

7. The multimedia control system of claim 1, wherein said communication interface comprises a satellite-radio receiver.

8. The multimedia control system of claim 1, wherein said communication interface comprises a local area network interface.

9. The multimedia control system of claim 1, wherein said communication interface comprises a wireless local area network interface.

10. The multimedia control system of claim 1, wherein at least one of said graphical user interface buttons comprises a button to select a desired program.

11. The multimedia control system of claim 1, wherein at least one of said graphical user interface buttons comprises a button to select a device-control screen.

12. The multimedia control system of claim 1, wherein at least one of said graphical user interface buttons comprises a button to select a setup screen.

13. The multimedia control system of claim 1, wherein at least one of said graphical user interface buttons comprises a button to open a dialog-type window corresponding to a selected program.

14. The multimedia control system of claim 1, wherein said programming information comprises information related to a current score of a program showing a sporting event.

15. The multimedia control system of claim 1, wherein said programming information comprises information related to a current news topic of a news program.

16. The multimedia control system of claim 1, wherein said icon corresponds to an episode of said program.

17. The multimedia control system of claim 1, wherein said programming content comprises cable television programming.

18. The multimedia control system of claim 1, wherein said programming content comprises satellite television programming.

19. The multimedia control system of claim 1, wherein said programming content comprises satellite radio programming.

20. The multimedia control system of claim 1, wherein said programming content comprises broadcast radio programming.

21. The multimedia control system of claim 1, wherein said programming content comprises DVD programming.

22. The multimedia control system of claim 1, wherein said programming content comprises audio CD programming.

23. The multimedia control system of claim 1, wherein said programming content comprises previously-recorded programming.

24. The multimedia control system of claim 1, wherein said programming content comprises previously-recorded programming stored in a personal video recorder.

25. A method for controlling one or more multimedia devices, comprising:
    receiving entertainment programming information over at least one first communications channel;
    receiving supplemental programming information over at least one second communications channel, wherein said supplemental programming information in includes information indicating which of one or more programs are currently at a commercial break;
    displaying said programming information on a display screen as a program screen comprising a plurality of graphical user interface buttons, each graphical user interface button corresponding to a program, each graphical user interface button configured to display an icon corresponding to said program; wherein the plurality of graphical user interface buttons are arranged in a matrix format wherein a first axis of said matrix corresponds to time and a second axis of said matrix corresponds to channel, wherein said icons of the plurality of graphical user interface buttons indicate which programs are available, which programs are in a commercial break and which programs are not in a commercial break;
    updating said program screen according to said supplemental programming information to indicate a current content of one or more entertainment programs during a time period of said one or more entertainment programs by graphically highlighting said icons of the plurality of graphical user interface buttons that correspond to programs that are in a commercial break to distinguish between programs that are in a commercial break and programs that are not at a commercial break;
    opening a dialog-type pop-up window for a first entertainment program in response to a first user-input command of one of the icon displayed on said matrix of said program screen to show additional information related to a program corresponding to the selected icon; and
    sending a remote-control command to one or more multimedia devices to select a second entertainment program in response to a second user-input command.

26. The method of claim 25, said sending a remote-control command comprises sending an infrared signal.

27. The method of claim 25, wherein said sending a remote-control command comprises sending a radio-frequency signal.

28. The method of claim 25, receiving entertainment programming comprises receiving data from a computer network.

29. The method of claim 25, receiving entertainment programming comprises receiving data from an Internet connection.

30. The method of claim 25, receiving entertainment programming comprises receiving data from a wireless communication channel.

31. The method of claim 25, receiving entertainment programming comprises receiving data from a wireless computer network.

32. The method of claim 25, receiving entertainment programming comprises receiving data from a satellite-radio system.

33. The method of claim 25, receiving entertainment programming comprises receiving data from a local-area network.

34. The method of claim 25, receiving entertainment programming comprises receiving data from a cable television network.

35. The method of claim 25, wherein at least one of said graphical user interface buttons comprises a button to select a desired program.

36. The method of claim 25, further comprising selecting a device-control screen.

37. The method of claim 25 further comprising selecting a setup screen.

38. The method of claim 25, further comprising selecting a program display format.

39. The method of claim 25, further comprising selecting a program screen format.

40. The method of claim 25, wherein said supplemental programming information comprises information related to a current score of a program showing a sporting event.

41. The method of claim 25, wherein said supplemental programming information comprises information related to a current news topic of a news program.

42. The method of claim 25, wherein said supplemental programming information comprises information related to a current topic of a science-related program.

43. The method of claim 25, wherein said icon displays video content of said program.

44. The method of claim 25, wherein said icon corresponds to an episode of said program.

45. The method of claim 25, wherein said entertainment programming comprises cable television programming.

46. The method of claim 25, wherein said entertainment programming comprises satellite television programming.

47. The method of claim 25, wherein said entertainment programming comprises satellite radio programming.

48. The method of claim 25, wherein said entertainment programming comprises broadcast radio programming.

49. The method of claim 25, wherein said entertainment programming comprises DVD programming.

50. The method of claim 25, wherein said entertainment programming comprises audio CD programming.

51. The method of claim 25, wherein said entertainment programming comprises previously-recorded programming.

52. The method of claim 25, wherein said entertainment programming comprises previously-recorded programming stored in a personal video recorder.

53. The method of claim 25, wherein said first and second user-input commands are made by using a human-interface device comprising a touch-screen.

54. The method of claim 25, wherein said first and second user-input commands are made by using a human-interface device comprising a computer mouse.

55. The method of claim 25, wherein said first and second user-input commands are made by using a human-interface device comprising a trackball.

56. The method of claim 25, wherein said first and second user-input commands are made by using a human-interface device comprising a speech-recognition system.

57. The multimedia control system of claim 1, wherein said icon displays video content of said program.

* * * * *